United States Patent [19]

Rydborn

[11] Patent Number: 5,323,015
[45] Date of Patent: Jun. 21, 1994

[54] DIRECTIONAL MOVEMENT SENSOR USING THREE LIGHT SENSING ELEMENTS AND DIFFERENTIAL AMPLIFIERS

[76] Inventor: Sten Å. O. Rydborn, Klöxhultsvägen 21, S-343 00 Älmhult, Sweden

[21] Appl. No.: 24,358

[22] Filed: Mar. 1, 1993

[30] Foreign Application Priority Data

Feb. 27, 1992 [SE] Sweden .................. 9200581

[51] Int. Cl.$^5$ ............................ G01N 21/86
[52] U.S. Cl. ................... 250/561; 250/208.2
[58] Field of Search ........ 250/561, 221, 222.1, 250/214 PR, 214 C, 208.2; 356/429, 28, 430–431, 238

[56] References Cited

U.S. PATENT DOCUMENTS

| | | | |
|---|---|---|---|
| 3,582,661 | 6/1971 | Emmasingel | 356/429 |
| 3,772,524 | 11/1973 | Erbstein | 356/429 |
| 3,812,348 | 5/1974 | Lippke | 250/561 |
| 4,710,622 | 12/1987 | Imamura | 250/214 C |
| 4,812,635 | 3/1989 | Kaufmann et al. | 250/205 |
| 4,868,402 | 9/1989 | Triponez | 250/214 C |
| 4,963,757 | 10/1990 | Liefde et al. | 356/429 |
| 5,075,540 | 12/1991 | Taniguchi et al. | 250/214 C |

FOREIGN PATENT DOCUMENTS

| | | | |
|---|---|---|---|
| 0135818 | 7/1985 | Japan | 250/214 C |
| 0156631 | 6/1989 | Japan | 250/214 C |

*Primary Examiner*—David C. Nelms
*Attorney, Agent, or Firm*—Antonelli, Terry, Stout & Kraus

[57] ABSTRACT

A device for generating an electric signal in response to movement of an object (1) past a predetermined point or within a predetermined area. At least three light sensitive elements (4, 5, 6) are placed side by side in the path of movement of the object (1) so that the object (1) moves past the elements (4, 5, 6) in sequence. A light source (2) is disposed for illuminating the light sensitive elements (4, 5, 6) directly or indirectly via a reflector (3). The light sensitive elements (4, 5, 6) are coupled to a signal processsing circuit, (12- 15) for evaluating the signals from the elements. The two outer light sensitive elements (4, 6) are coupled to respective differential amplifiers (12, 13), while the intermediate light sensitive element (5) is reference coupled to both of the differential amplifiers (12, 13).

4 Claims, 3 Drawing Sheets

DIRECTIONAL MOVEMENT SENSOR USING THREE LIGHT SENSING ELEMENTS AND DIFFERENTIAL AMPLIFIERS

BACKGROUND OF THE INVENTION

The present invention relates to a device for generating an electric signal in response to movement in a certain direction of an object, eg. a thread, past a predetermined point and/or within a predetermined area.

Within the technology for contact-free sensing of the movement of an object, eg. a thread, past a predetermined point or within a predetermined area, it is known to utilize optical arrangements with a transmitter (light source) and a receiver (light sensitive element) or one transmitter and two receivers. The commonest design is with one transmitter and one receiver. In the case of one transmitter and two receivers, the two receivers are often coupled differentially for compensation against disturbances from the surroundings. In practice however, these latter systems suffer from a major drawback in that they are relatively insensitive, in particular to relatively rapid movement of a thin thread past the receivers. It has moreover been found that such a system does not react to a thick thread moving slowly past the receivers. This may be because the thread bends powerfully and acts on both receivers simultaneously and is, therefore, discriminated against by the differentially coupled receivers. In other systems with two receivers, the object is not to provide a differential coupling but to distinguish between passing dust particles and a thread movement. In this case, an arrangement is employed in which the thread always actuates first one receiver and then the other receiver, while passing dust particles in all probability actuate only the one or the other receiver. In this case, the receivers are coupled to a signal processing circuit which requires first a signal from the first receiver and, within a certain time period, a signal from the second receiver. This otherwise satisfactory solution does not, however, allow for a strongly bending thread, since such a thread can actuate both receivers simultaneously, as mentioned above.

SUMMARY OF THE INVENTION

The object of the present invention is to provide an improved device for obviating the above-considered drawbacks inherent in prior art such devices.

With a device according to the present invention, it is possible, with great dependability, to determine whether an object, eg. a thread, moves in the correct direction irrespective of whether the thread is thin or thick and irrespective of whether it moves slowly or quickly. Moreover, it is possible to compensate the device according to the present invention for, for example, pulsating light from the surroundings and to discriminate against foreign particles, eg. dust and the like.

There is a great need for such a device primarily within the textile industry where it is desirable to employ such a device as a breakage sensor on roving or fournisseur machines and also as arrival sensors on certain types of looms.

BRIEF DESCRIPTION OF THE DRAWINGS

The present invention will be described by way of example in the following disclosure, with particular reference to the accompanying drawings.

DETAILED DESCRIPTION OF PREFERRED EMBODIMENTS

Figure 1:
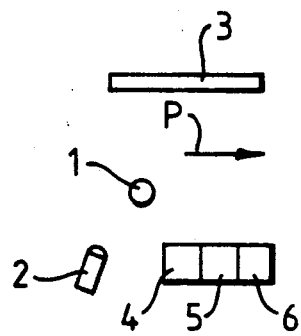
FIG. 1 schematically shows a layout of a the device according to the present invention.

In the embodiments of a device according to the present invention shown on the drawings, it is desired to sense the movement of a thread 1 in the direction of the arrow P. In the embodiment according to FIG. 1, a light generating element 2 is placed for illuminating the thread 1 and a reflector 3. The light generating element 2 is advantageously a light emitting diode. Three light sensitive elements 4, 5 and 6 are placed beside one another and in the path of movement of the thread 1 in such a manner that the thread 1, on movement in the direction of the arrow P, passes the light sensitive elements 4, 5, and 6 in sequence after one another. These elements may be per se known photo diodes, and a shadow of the thread 1 will fall on each element 4, 5, and 6 during of the thread 1 in the direction of the arrow P.

Figure 2:
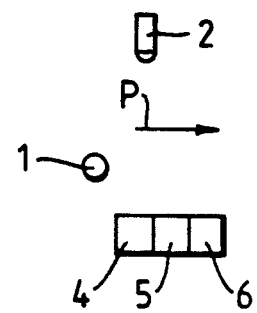
FIG. 2 shows a similar layout to that of FIG. 1 of another embodiment of a device according to the present invention.

In the embodiment according to FIG. 2 the reflector 3 has been omitted and replaced by the LED 2, with the result that, in this embodiment, direct illumination is effected of the light sensitive elements 4, 5 and 6, while the light sensitive elements 4, 5 and 6 in FIG. 1 are illuminated indirectly via the reflector 3.

While it is desirable to sense the transverse movement of the thread 1 in the direction of the arrow P, it is obvious that the thread 1 also moves in its longitudinal direction.

Figure 3:
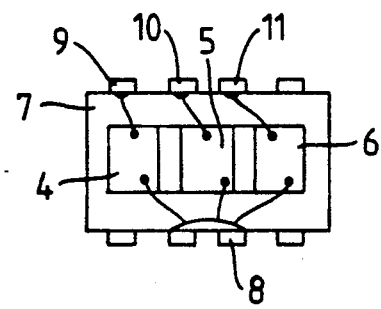
FIG. 3 shows a schematic view of one component for the device according to the present invention.

FIG. 3 exemplifies one component which consists of a substrate 7 on which the three light sensitive elements 4, 5 and 6 are disposed. The light sensitive elements 4, 5 and 6 are coupled to a common cathode 8 and each to its respective contact 9, 10 and 11.

In one embodiment of such a component, the length of the substrate plate is 11 mm and its height is 6 mm, while the light sensitive elements are approx. 3 mm high and slightly narrower.

Figure 4:
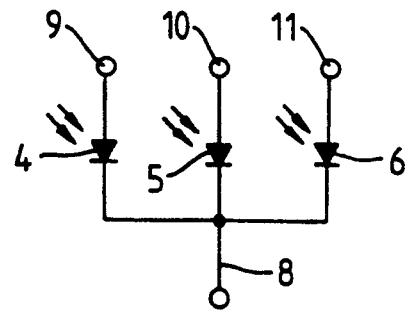
FIG. 4 shows an electric coupling diagram for the component in FIG. 3.

FIG. 4 shows an electric coupling diagram for the component illustrated in FIG. 3, the same parts having been given the same reference numerals in the different drawing figures.

Figure 5:
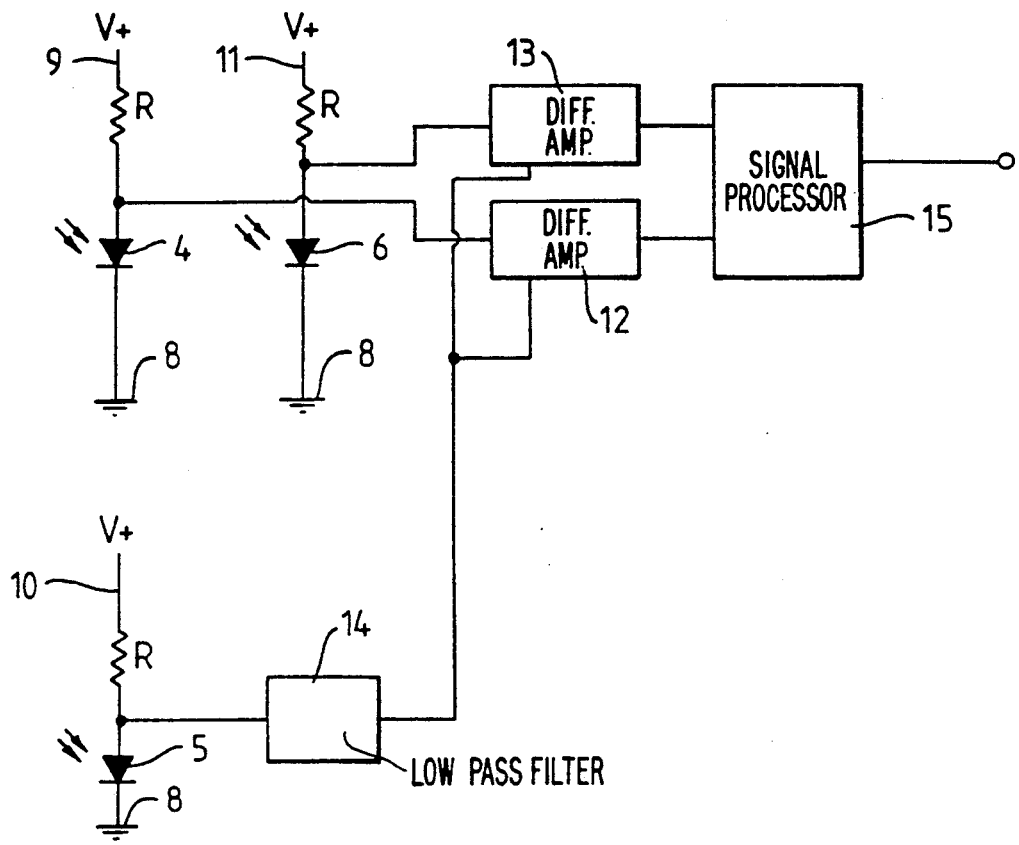
FIG. 5 shows a schematic, electric coupling diagram for a device according to the present invention.

A schematic coupling diagram of a device according to the present invention is shown in FIG. 5, the same parts as in the preceding figures having been given the same reference numerals. The outer light sensitive elements 4 and 6 are, as is apparent from FIG. 5, each coupled to a respective differential amplifier 12 and 13, and amplifiers 12 and 13 are in turn coupled to the intermediate light sensitive element 5 via a low pass filter 14. The differential amplifiers 12 and 13 are coupled to a signal processing circuit 15 for evaluating the signals from the light sensitive elements 4, 5 and 6. The light sensitive elements or photo diodes 4 and 6 serve as the actual thread sensors, while the light sensitive element, or photo diode 5 serves as a reference sensor. The signals from the photo diodes 4 and 6 are coupled, in principle without any filtering whatever, to the differential amplifiers 12 and 13, whereby both high frequency and low frequency signals pass further to these amplifiers. The signal from the photo diode 5 is fed to the differential amplifiers 12 and 13 via the low pass filter 14. In this way, it will be possible to establish whether the thread moves in the correct direction, to compensate for unsuitably pulsating light from the surroundings and to discriminate for foreign particles. The signal processing circuit 15 is, as disclosed previously, arranged to establish the voltage derivative (signal change/time unit). This makes possible not only the above-mentioned compensations and discriminations, but also determination of the direction of movement of the thread.

In that the three photo diodes 4, 5 and 6 are disposed on one and the same substrate, all three will have the same thermal, optical and electrical properties. The photo diodes 4, 5 and 6 on one such substrate plate 7 will have relatively large active surfaces and will, notwithstanding, be extremely rapid. In a device according to the present invention, the serious drawbacks inherent in prior art optical components in these contexts are obviated. Drawbacks such as sensitivity to dirt and extreme sensitivity to modulation of light from the surroundings are completely eliminated using a device according to the present invention.

Figure 6:
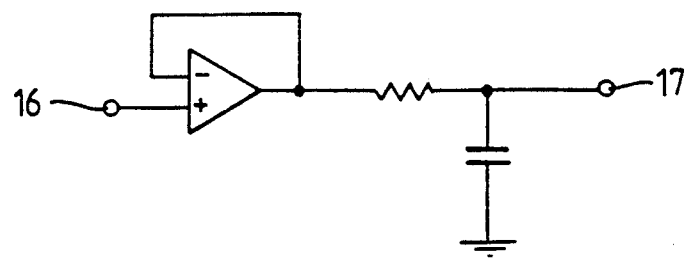
FIG. 6 shows a coupling diagram for a low pass filter for the device according to the present invention.

FIG. 6 exemplifies a low pass filter 14 for the device according to the present invention. The anode in the photo diode 5 is coupled to the input 16 which, in turn, is coupled to the output 17 via an operational amplifier and a resistor, the output 17 being moreover coupled to ground via a capacitor.

Figure 7:
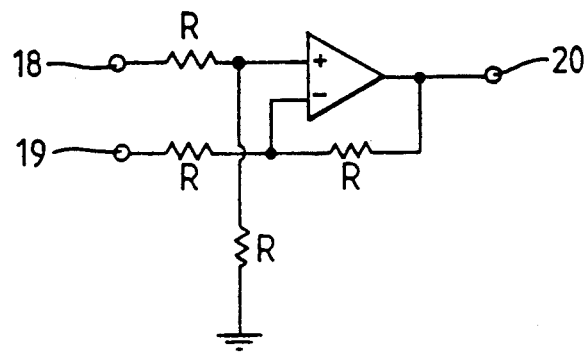
FIG. 7 shows a coupling diagram for a differential amplifier for a device according to the present invention.

FIG. 7 exemplifies the differential amplifiers 12 and 13 for the device according to the present invention. The output 17 from the low pass filter 14 is coupled to the input 19 of the two differential amplifiers 12 and 13, which in turn is coupled to the output 20 via two resistors, the connection between them being coupled to the negative input of an operational amplifier. The positive input of the operational amplifier is coupled to the input 18 via a resistor and to ground via a resistor. The input 18 to the one differential amplifier 12 is coupled to the anode of the photo diode 4, while the input 18 of the second differential amplifier 13 is coupled to the anode of the photo diode 6.

Figure 8:
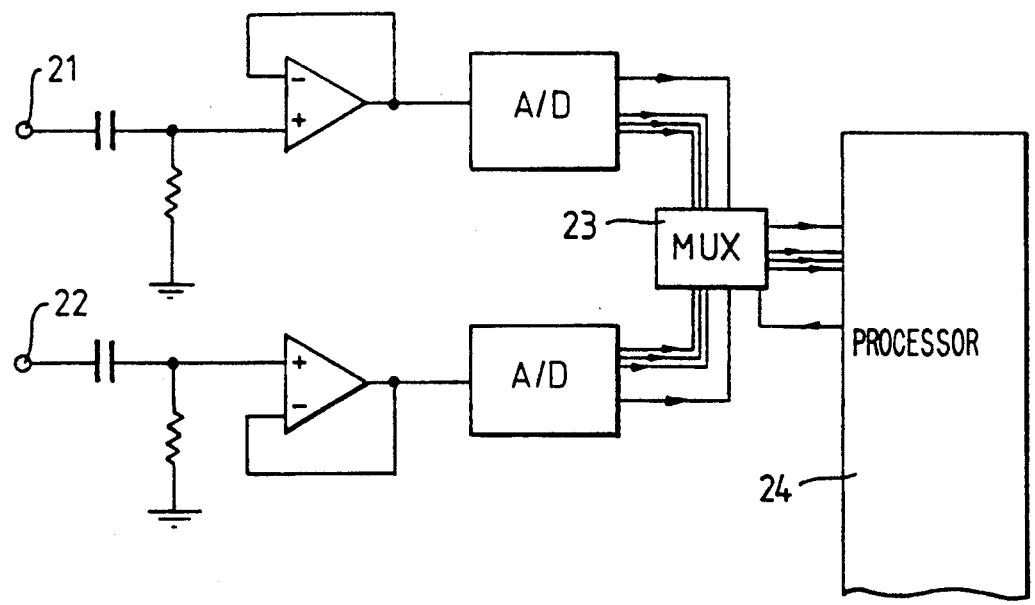
FIG. 8 shows a block diagram for a signal processing circuit for the device according to the present invention.

FIG. 8 exemplifies the signal processing circuit 15 for the device according to the present invention. The output 20 from the differential amplifier 12 is coupled to the input 21, while the output 20 of the second differential amplifier 13 is coupled to the second input 22. The inputs 21 and 22 are coupled to a multiplex circuit 23 via respective high pass filter, their impedance adapting operational amplifier, and A/D converters. The multiplex circuit 23 is coupled to a suitable processor 24, which may be a microcomputer of suitable type for the desired evaluation of the signals received.

Many modifications of the above-described embodiments are naturally possible without departing from the spirit and scope of the inventive concept as defined in the appended claims.

I claim:

1. A device for generating an electric signal in response to movement in a certain direction of an object past a predetermined point comprising three light sensitive elements placed side by side in the path of movement of the object so that the object moves past the elements in sequence; a light source disposed for illuminating the light sensitive elements; first and second differential amplifiers coupled respectively to two outer light sensitive elements and to an intermediate light sensitive element; and a signal processing circuit coupled to the outputs of the differential amplifiers for evaluating the signals from the differential amplifiers.

2. The device as claimed in claim 1, wherein the light sensitive elements comprise a single substrate and three photo diodes disposed on the substrate.

3. The device as claimed in claim 1, further comprising a low pass filter coupling the intermediate light sensitive element to the differential amplifiers.

4. The device as claimed in claim 1, wherein the signal processing circuit comprises an electronic circuit for establishing the voltage derivative.

* * * * *